US012695856B2

(12) United States Patent
Yasuda

(10) Patent No.: US 12,695,856 B2
(45) Date of Patent: Jul. 28, 2026

(54) SYSTEMS AND METHODS FOR ADAPTING A DISPLAY DEPTH OF AN OBJECT AROUND A VEHICLE

(71) Applicant: Toyota Research Institute, Inc., Los Altos, CA (US)

(72) Inventor: Hiroshi Yasuda, San Carlos, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/761,915

(22) Filed: Jul. 2, 2024

(65) Prior Publication Data

US 2026/0012563 A1 Jan. 8, 2026

(51) Int. Cl.
G05D 1/02 (2020.01)
G06T 7/50 (2017.01)
(Continued)

(52) U.S. Cl.
CPC ............. H04N 13/128 (2018.05); G06T 7/50 (2017.01); G06T 7/73 (2017.01); G06V 10/764 (2022.01);
(Continued)

(58) Field of Classification Search
CPC .. H04N 13/128; H04N 13/167; H04N 13/302; G06T 7/50; G06T 7/73;
(Continued)

(56) References Cited

U.S. PATENT DOCUMENTS 5,793,900 A * 8/1998 Nourbakhsh ........ H04N 13/271
348/355
10,810,774 B2 * 10/2020 Lee ........................... G06T 7/55
(Continued)

FOREIGN PATENT DOCUMENTS

CN 110378243 A 10/2019
CN 117853611 A 4/2024
(Continued)

OTHER PUBLICATIONS

Lang et al., "Nonlinear Disparity Mapping for Stereoscopic 3D," ACM Transactions on Graphics, vol. 29, No. 4, article No. 75, pp. 1-10.
(Continued)

*Primary Examiner* — Howard D Brown, Jr.
(74) *Attorney, Agent, or Firm* — Christopher G. Darrow; Darrow Mustafa, PC

(57) ABSTRACT

Systems, methods, and other embodiments described herein relate to identifying objects and adapting display depth of a three-dimensional (3D) display for an object that increases situational awareness. In one embodiment, a method includes identifying objects within a field-of-view (FOV) using real depth that is detected by a vehicle. The method also includes positioning the objects within layers using the real depth and a display depth. The method also includes altering the display depth for the objects with a separation degree between the layers using a safety parameter, the display depth is associated with coordinate points of a display. The method also includes receiving a driving command according to the display depth.

20 Claims, 5 Drawing Sheets

(51) Int. Cl.

| | |
|---|---|
| *G06T 7/73* | (2017.01) |
| *G06V 10/764* | (2022.01) |
| *G06V 20/58* | (2022.01) |
| *H04N 13/128* | (2018.01) |
| *H04N 13/167* | (2018.01) |
| *H04N 13/302* | (2018.01) |
| *B60K 35/23* | (2024.01) |
| *B60K 35/81* | (2024.01) |

(52) U.S. Cl.

CPC ........... *G06V 20/58* (2022.01); *H04N 13/167* (2018.05); *H04N 13/302* (2018.05); *B60K 35/23* (2024.01); *B60K 35/81* (2024.01); *B60K 2360/164* (2024.01); *G06T 2207/30196* (2013.01); *G06T 2207/30261* (2013.01); *G06V 2201/08* (2022.01)

(58) Field of Classification Search

CPC ........... G06T 2207/30196; G06T 2207/30261; G06V 10/764; G06V 20/58; G06V 2201/08; B60K 35/23; B60K 35/81; B60K 2360/164

See application file for complete search history.

(56) References Cited

U.S. PATENT DOCUMENTS

| | | | | |
|---|---|---|---|---|
| 11,288,553 | B1 * | 3/2022 | Murad | .................. G06F 18/253 |
| 12,027,113 | B1 * | 7/2024 | Broggi | .................. G06F 3/1423 |

| | | | | |
|---|---|---|---|---|
| 2004/0109004 | A1 | 6/2004 | Bastos et al. | |
| 2013/0044104 | A1 | 2/2013 | Bouie | |
| 2015/0067008 | A1 * | 3/2015 | Kamath | .................... G06T 5/70 |
| | | | | 708/202 |
| 2016/0325680 | A1 * | 11/2016 | Curtis | .................... H04W 4/024 |
| 2020/0249689 | A1 * | 8/2020 | Tatsubori | ................. E01F 9/00 |
| 2020/0358961 | A1 * | 11/2020 | Kimura | ............. G01B 11/2513 |
| 2021/0099686 | A1 | 4/2021 | Panchagnula et al. | |
| 2023/0144893 | A1 | 5/2023 | Chan | |
| 2023/0245373 | A1 | 8/2023 | Xiong et al. | |
| 2023/0344975 | A1 * | 10/2023 | Ryu | .................... H04N 13/128 |

FOREIGN PATENT DOCUMENTS

| | | |
|---|---|---|
| EP | 1859410 A1 | 11/2007 |
| WO | 2012074361 A1 | 6/2012 |

OTHER PUBLICATIONS

Bai et al., "Monocular Outdoor Semantic Mapping with a Multi-task Network," 2019 IEEE/RSJ International Conference on Intelligent Robots and Systems (IROS), Macau, China, 2019, pp. 1992-1997.

Wang et al., "Automatic Layer Separation using Light Field Imaging," arXiv:1506.04721, Jun. 15, 2015, pp. 1-9.

Fang et al., "GroupTransNet: Group Transformer Network for RGB-D Salient Object Detection," arXiv:2203.10785, Journal of Latex Class Files, vol. 14, No. 8, Aug. 2021, pp. 1.11.

* cited by examiner

SYSTEMS AND METHODS FOR ADAPTING A DISPLAY DEPTH OF AN OBJECT AROUND A VEHICLE

TECHNICAL FIELD

The subject matter described herein relates, in general, to adapting display depth for a vehicle operator, and, more particularly, to adapting display depth of a three-dimensional (3D) display to increase situational awareness for the vehicle operator.

BACKGROUND

Vehicles equipped with sensors acquire data that facilitate perceiving other vehicles, obstacles, pedestrians, and additional aspects of a surrounding environment. For example, a vehicle equipped with a light detection and ranging (LIDAR) sensor uses light to scan the surrounding environment. Logic associated with the LIDAR analyzes acquired data to detect object presence and other features of the surrounding environment. In further examples, cameras acquire information about the surrounding environment from which a system derives awareness about aspects of the surrounding environment. Sensor data can be useful in various circumstances for improving perceptions of the surrounding environment for operators to control a vehicle. Automated driving systems (ADS) can also accurately plan a path for the vehicle through perception derived from the sensor data.

Moreover, in one embodiment, an ADS estimating awareness about a surrounding environment generates alerts about objects and assists an operator with avoiding hazards. Vehicle systems can display the objects within a field-of-view (FOV) using an infotainment system, a heads-up display (HUD), etc., for notifying the operator. These systems can aid the operator with maneuvering among the objects by projecting real-time information including separation distance and speed data about the vehicle and surrounding traffic. For example, a HUD on a vehicle overlays information using augmented reality (AR) and night vision to heighten awareness about a dangerous situation involving other vehicles within the FOV using the speed data. However, the vehicle systems can fail at increasing sufficient awareness due to various phenomena. For instance, any one of inaccurate sensor data, outdated maps, and a limited FOV hamper perception systems. Therefore, vehicle systems perceiving the environment to build awareness and assist an operator encounter difficulties that impact performance, thereby reducing vehicle safety and comfort.

SUMMARY

In one embodiment, example systems and methods relate to identifying objects and adapting display depth of a three-dimensional (3D) display for an object that increases situational awareness. In various implementations, systems assisting vehicle operators with alerts and notifications about detected objects within a vehicle surrounding using sensor data involve overly complex interfaces that decrease effectiveness. Furthermore, operators may ignore systems relying solely on auditory alerts for safety rather than visual cues about objects within a field-of-view (FOV), thereby creating dangerous scenarios. A vehicle operator can also ignore alerts from systems generating false positives and negatives due to perception errors for objects. In one approach, vehicles that indicate important objects through adding graphic material, altering object appearance, etc., can cause confusion and increase computational costs. As such, vehicle systems perceiving objects within a FOV can insufficiently increase awareness involving dangerous scenarios and encounters, thereby decreasing system confidence.

Therefore, in one embodiment, an adaptation system alters a separation degree among objects within a FOV that changes appearance on a display (e.g., a 3D display) and naturally increases awareness during driving. Here, the adaptation system can detect real depth of the objects and change a display depth for the display using the separation degree that improves safety while maintaining computation costs. In one approach, the display depth is associated with coordinate points of a 3D display operating within a vehicle. In this way, objects that may be obstacles (e.g., rocks, humans, etc.) are visually exaggerated through varying relative depth and gaps using the separation degree. Furthermore, the adaptation system can change the separation degree between the objects according to a safety parameter (e.g., a time-to-collision, a separation distance, etc.) for highlighting elements within the FOV while driving. As such, a collision can be avoided through adapting the separation degree when a risky encounter with an object is imminent. Accordingly, the adaptation system improves awareness of a displayed object demanding attention over other objects through manipulating display depth and a separation degree, thereby improving awareness without adding computational complexity.

In one embodiment, an adaptation system that identifies objects and adapts display depth of a 3D display for an object that increases situational awareness is disclosed. The adaptation system includes a memory storing instructions, that when executed by a processor, cause the processor to identify objects within a FOV using real depth that is detected by a vehicle. The instructions also include instructions to position the objects within layers using the real depth and a display depth. The instructions also include instructions to alter the display depth for the objects with a separation degree between the layers using a safety parameter, the display depth is associated with coordinate points of a display. The instructions also include instructions to receive a driving command according to the display depth.

In one embodiment, a non-transitory computer-readable medium for identifying objects and adapting display depth of a 3D display for an object that increases situational awareness and including instructions that when executed by a processor cause the processor to perform one or more functions is disclosed. The instructions include instructions to identify objects within a FOV using real depth that is detected by a vehicle. The instructions also include instructions to position the objects within layers using the real depth and a display depth. The instructions also include instructions to alter the display depth for the objects with a separation degree between the layers using a safety parameter, the display depth is associated with coordinate points of a display. The instructions also include instructions to receive a driving command according to the display depth.

In one embodiment, a method for identifying objects and adapting display depth of a 3D display for an object that increases situational awareness is disclosed. In one embodiment, the method includes identifying objects within a FOV using real depth that is detected by a vehicle. The method also includes positioning the objects within layers using the real depth and a display depth. The method also includes altering the display depth for the objects with a separation degree between the layers using a safety parameter, the display depth is associated with coordinate points of a display. The method also includes receiving a driving command according to the display depth.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with identifying objects and adapting a display depth of a three-dimensional (3D) display for an object that increases situational awareness are disclosed herein. In various implementations, systems are augmenting environments having two-dimensional (2D) displays with 3D displays to output images exhibiting detailed depth. For example, a 3D display can present objects while factoring relative depth between the objects with a field-of-view (FOV) of a camera. As such, closer objects within a scene can have decreased depth and depth increases for objects further away from a source. In one approach, these systems implemented in a vehicle acquire images from multiple cameras such as a backup camera, a top-down camera (e.g., a birds-eye camera), a terrain camera, etc. Here, the vehicle can generate visual effects for the objects using the 3D display. However, visual effects can be computationally intensive and distract vehicle operators when augmenting elements within a scene. Thus, systems using a 3D display to vary image perception using depth can increase complexity and decrease driving comfort.

Therefore, in one embodiment, an adaptation system estimates real depth for identified objects within a camera FOV and alters display presentation using display depth that increases relevance through varying a relative depth. Here, the real depth may be one of a physical depth, real distance, etc., of the objects measured away from a camera source, such as a vehicle camera. In one approach, the adaptation system positions the objects within layers through mapping the real depth to the display depth. For example, the layers are continuous elements of an image frame on the display that lay out the objects using the display depth. Furthermore, the display depth can be coordinate points (e.g., x-y coordinates) of a 3D display. Optical components and a graphics processor associated with the 3D display can give the objects 3D depth according to the display depth and a computed separation degree.

Moreover, the adaptation system can alter the display depth for the objects with the separation degree between the layers using a safety parameter associated with increasing relevance. For instance, a machine learning (ML) model computes a time-to-collision to the objects as the safety parameter. As such, the adaptation system can prevent a collision through displaying relevant objects closer than other objects, thereby increasing operator awareness. In other words, the adaptation system virtually displays the object as appearing closer than other objects rather than displaying the objects proportionally (e.g., linearly) using the real depth. Accordingly, the adaptation system changes display depth for displaying relevant objects closer than detected real depth, thereby increasing focus and attention to areas within a scene.

Figure 1:
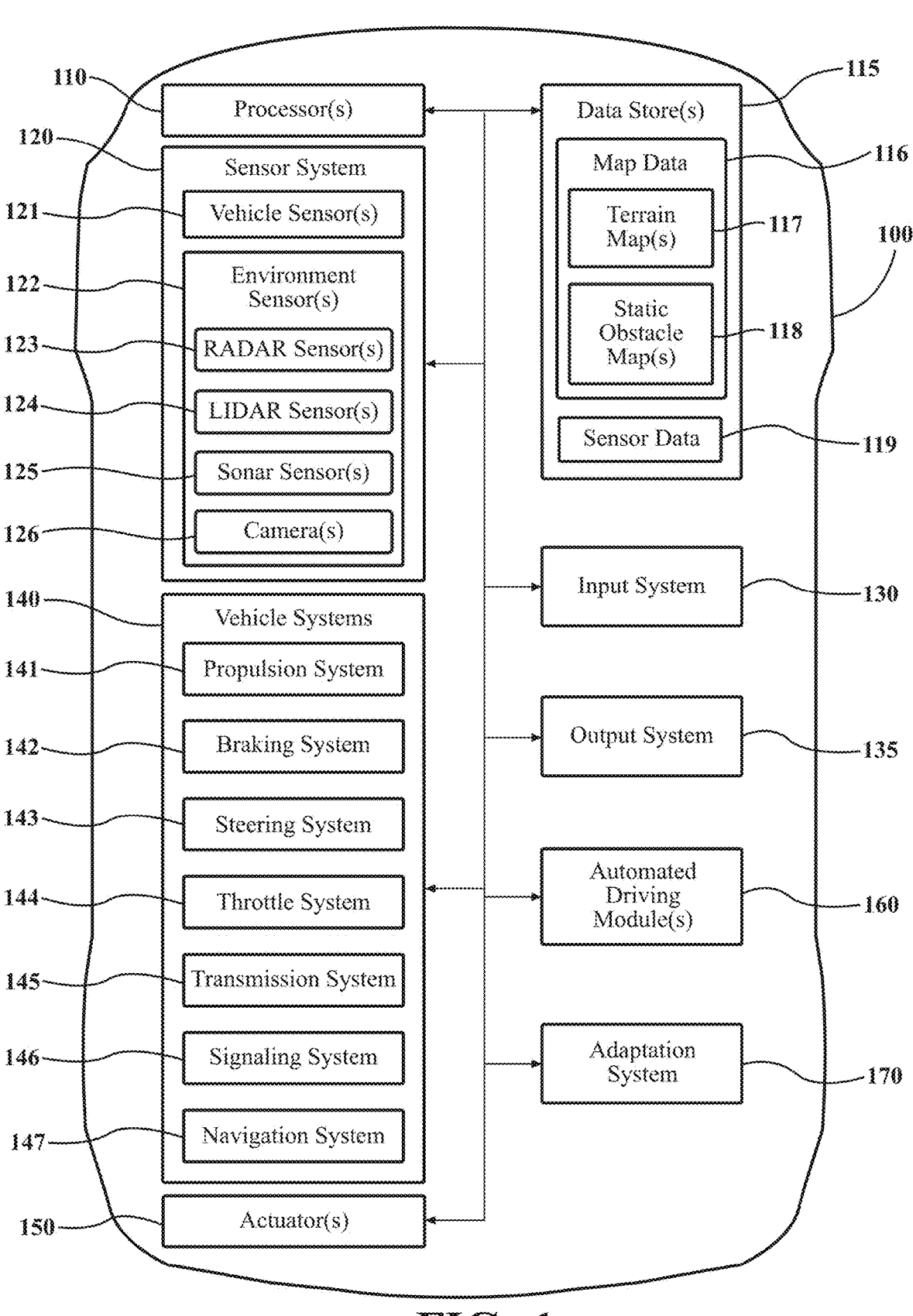
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, an adaptation system 170 uses road-side units (RSU), consumer electronics (CE), mobile devices, robots, drones, and so on that benefit from the functionality discussed herein associated with identifying objects and adapting display depth of a 3D display for an object that increases situational awareness.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, one or more components of the disclosed system can be implemented within a vehicle while further components of the system are implemented within a cloud-computing environment, as a cloud-based service, or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an adaptation system 170 that is implemented to perform methods and other functions as disclosed herein relating to identifying objects and adapting display depth of a 3D display for an object that increases situational awareness.

Figure 2:
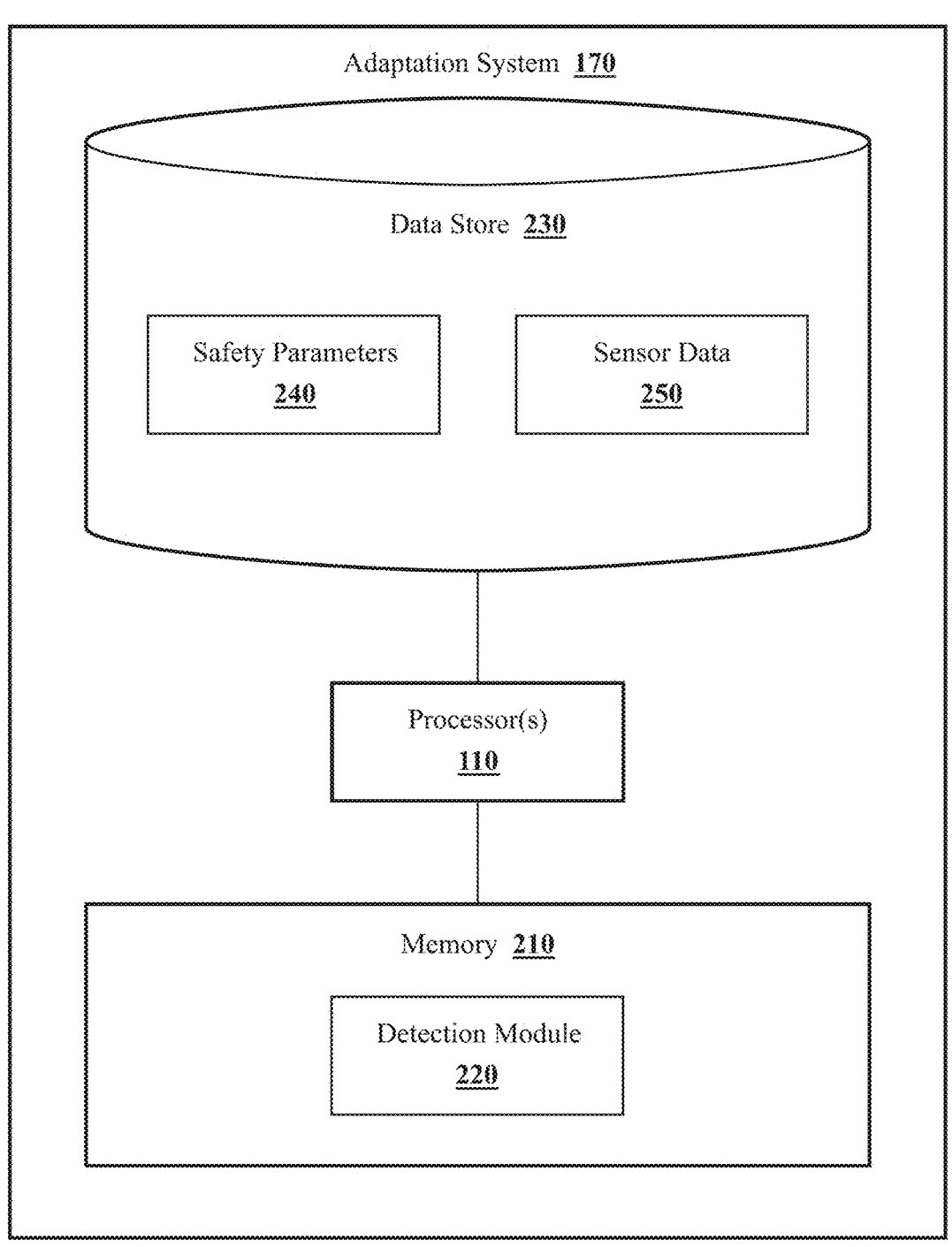
FIG. 2 illustrates one embodiment of an adaptation system that alters a separation degree among objects within a field-of-view (FOV) for changing appearance on a display.

With reference to FIG. 2, one embodiment of the adaptation system 170 of FIG. 1 is further illustrated. The adaptation system 170 is shown as including a processor(s) 110 from the vehicle 100 of FIG. 1. Accordingly, the processor(s) 110 may be a part of the adaptation system 170, the adaptation system 170 may include a separate processor from the processor(s) 110 of the vehicle 100, or the adaptation system 170 may access the processor(s) 110 through a data bus or another communication path. In one embodiment, the adaptation system 170 includes a memory 210 that stores a detection module 220. The memory 210 is a random-access memory (RAM), a read-only memory (ROM), a hard-disk drive, a flash memory, or other suitable memory for storing the detection module 220. The detection module 220 is, for example, computer-readable instructions that when executed by the processor(s) 110 cause the processor(s) 110 to perform the various functions disclosed herein.

The adaptation system 170 as illustrated in FIG. 2 is generally an abstracted form of the adaptation system 170 as may be implemented between the vehicle 100 and a cloud-computing environment. Furthermore, in FIG. 2 the detection module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires sensor data 250 that includes at least camera images. In further arrangements, the detection module 220 acquires the sensor data 250 from further sensors such as radar sensors 123, LIDAR sensors 124, and other sensors as may be suitable for identifying vehicles and locations of the vehicles.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the adaptation system 170 and/or the detection module 220 can employ other techniques to acquire the sensor data 250 that are either active or passive. For example, the detection module 220 passively sniffs the sensor data 250 from a stream of electronic information provided by the various sensors to further components within the vehicle 100. Moreover, the adaptation system 170 and/or the detection module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In addition to locations of surrounding vehicles and objects, the sensor data 250 includes, for example, information about lane markings, and so on. Moreover, the adaptation system 170 and the detection module 220, in one embodiment, control the sensors to acquire the sensor data 250 about an area that encompasses 360 degrees about the vehicle 100 in order to provide a comprehensive assessment of the surrounding environment. Of course, in alternative embodiments, these systems acquire the sensor data 250 about a forward direction alone when, for example, the vehicle 100 is not equipped with further sensors to include additional regions about the vehicle and/or the additional regions are not scanned due to other reasons.

Moreover, in one embodiment, the adaptation system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the detection module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the safety parameters 240 representing one of a separation distance between the vehicle 100 and another vehicle, a time-to-collision (ToC) with an object, a risk level during driving, and state information (e.g., gaze) about an operator derived from the sensor data 250. In one approach, an advanced driving assistance system (ADAS) estimates the ToC using a ML model that is trained. Similarly, the risk level can be computed by the ADAS using the ML model, a physical model, etc., using the sensor data 250, such as a point-cloud derived using information from the LIDAR sensors 124.

Moreover, in one approach, the adaptation system 170 uses a ML algorithm, such as a convolutional neural network (CNN), to perform semantic segmentation over the sensor data 250 from which further information is derived about objects and object depth for generating visualizations. Of course, in further aspects, the adaptation system 170 may employ different machine learning algorithms or implement different approaches for performing the associated functions, which can include deep convolutional encoder-decoder architectures, or another suitable approach that generates semantic labels for the separate object classes represented in the image. Whichever particular approach the adaptation system 170 implements, the adaptation system 170 provides an output with semantic labels identifying objects represented in the sensor data 250. In this way, display depth can be altered to exaggerate objects that are identified and relevant and important among other objects.

Figure 3:
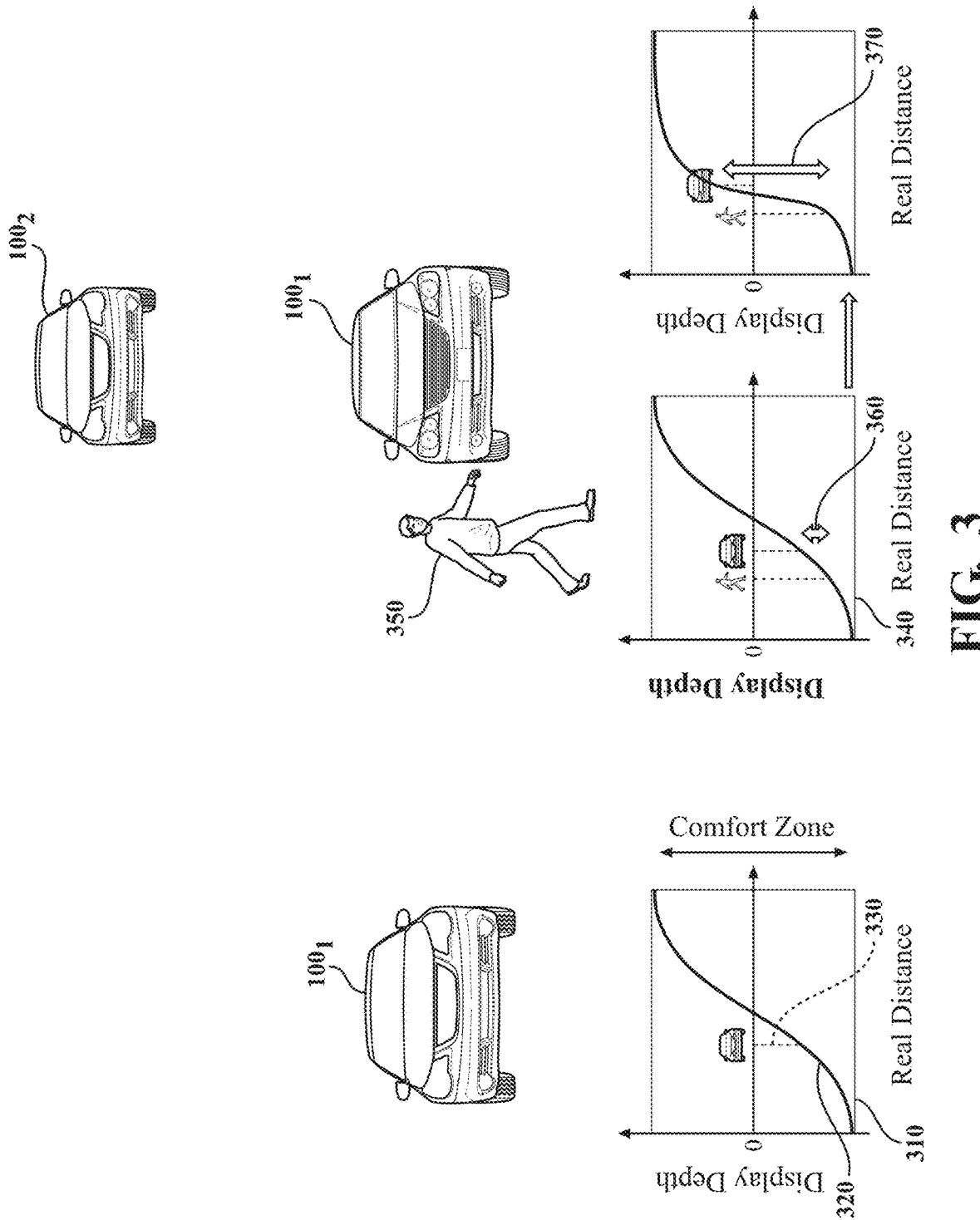
FIG. 3 illustrates an example of the adaptation system changing a display depth and a separation degree for the objects according to a parameter.

Now turning to FIG. 3, an example of the adaptation system 170 changing display depth and a separation degree for objects compared with a real distance using a parameter is illustrated. Here, the parameter can be operator comfort (e.g., driving separation), the safety parameters 240, importance, etc. Furthermore, the real distance may be similar to a real depth for the examples given herein. The real distance may also differ from the real depth, such as when estimated using a learning model rather than measured through radar (e.g., sonar, LIDAR, etc.) In one embodiment, the adaptation system 170 and/or detection module 220 are further configured to perform additional tasks beyond controlling the respective sensors to acquire and provide the sensor data 250. For example, the detection module 220 includes instructions that cause the processor 110 to identify the objects within a camera FOV using real depth. The camera can be a monocular camera, a stereo camera, a front camera, a backup camera, etc., from one or more camera(s) 126 that capture images in 2D for display by a 3D display. This includes estimating depth using a physical model that assembles a point-cloud or a data-driven model (e.g., a CNN) that forms the images outputted from the one or more camera(s) 126. Furthermore, the vehicle 100 can integrate the 3D display into an infotainment, a heads-up display (HUD), digital side-mirrors, digital rear-mirrors, etc., for displaying the images having altered depth that increases object awareness.

Additionally, in one approach, the adaptation system 170 positions the objects within layers using the real depth and the display depth. Furthermore, the adaptation system 170 can alter a display depth for the objects with the separation degree between the layers using the safety parameters 240. For example, the display depth is associated with coordinate points of a 3D display. In this way, the adaptation system 170 builds awareness about the objects through changing relative depth between the objects by manipulating the display depth. The awareness can trigger feedback such as receiving a driving command when the adaptation system 170 is implemented within the vehicle 100.

In various implementations, identifying the objects within a camera FOV using real depth involves the vehicle 100 acquiring the sensor data 250 from the one or more camera(s) 126 such as a backup camera, top-down camera (e.g., a birds-eye camera), a terrain camera, etc. For example, the real depth is one of physical depth, an absolute depth, etc., estimated by the ML model and/or computed with a physical model. The real depth can be mapped with a display depth for visualizing and displaying the objects on a display from the camera FOV. For 3D displays, optical components and a graphics engine can give the objects 3D depth according to the display depth. For instance, a 3D display creates a parallax effect for left and right eyes where a viewer sees different images of a scene using optics within the display and software-driven imagery. The viewer perceives depth through a disparity between the different images for various objects within the scene.

The display depth can also be coordinate points (e.g., x-y coordinates) of a 3D display that are one of continuous, layered, etc., associated with an image frame. For instance, a first layer is 30 feet and 3, a second layer is 60 feet and 6, and a third layer is 90 feet and 9 along coordinate points representing a mapping between the real depth and the display depth, respectively. A layer can have one or more objects exhibited at a display depth for a viewer to perceive different depths. In one approach, the 3D display continuously maps real distance to the objects within a vehicle environment since a road segment is flat. As such, the vehicle 100 can incorporate an image having these layers exhibiting depth between the objects within one of a HUD and an infotainment system. In this way, the objects within these layers can be associated with real depth for alterations that intuitively build awareness through enhanced visuals.

In scenario 310, a display depth and a comfort zone are compared to real distances involving vehicle 100₁ for representing normal separations between objects. A zero line can be a real distance to an object ahead of the vehicle 100. A depth curve 320 represents coordinates for the display depth (y-axis) compared to a lateral distance (x-axis). For instance, y-values for display depth increase and x-values representing real distances to objects increase. Here, a real distance (e.g., 3) between the vehicle 100 and another vehicle 100₁ is proportionally mapped to the depth curve 320 (e.g., −3) as depth 330 for display with a 3D display. As such, the scenario 310 represents a normal relationship between objects. Furthermore, the display depth may be correlated with a comfort zone. As previously mentioned, a viewer perceives depth through a disparity between different images output by the 3D display. The disparity can be associated with a range and the comfort zone represents a disparity range where a viewer can see the objects among a scene without encountering visual distortion and conflict. For instance, the comfort zone is a quadrangular space from the display screen to a background of the scene having the objects within an image.

In scenario 340, a driving encounter involves a pedestrian 350 and the vehicle 100₁ ahead of the vehicle within a camera FOV. Although this example involves the pedestrian 350, the adaptation system 170 can alter a display depth involving various objects within a FOV of the vehicle 100 for exaggerating relative separations. In one approach, the adaptation system 170 generates a view having the pedestrian 350 in a first layer (e.g., a foreground), the vehicle 100₁ in a second layer (e.g., a middle-ground), and a vehicle 100₂ in a third layer (e.g., a background) farther away from the vehicle 100. Such an alignment and positioning can be formed through the detection module 220 identifying the pedestrian 350, the vehicle 100₁, and the vehicle 100₂ within a camera FOV using real depth. Here, a separation degree 360 can be a display depth difference +2 where the vehicle 100₁ is at a display depth −7 and the pedestrian 350 is at a display depth −5. The separation degree 360 can represent a view giving a normal appearance of depth between the vehicle 100₂ and the pedestrian 350.

In various implementations, the adaptation system 170 alters the display depth and a separation degree 370 for the scenario 340, such as through factoring situational importance, the safety parameters 240, etc. For instance, the separation degree 370 between the layers can cause the vehicle 100₁ to appear closer to the vehicle 100₂ (i.e., a decreased relative distance). As such, the separation degree 370 can exhibit an increased distance between the pedestrian 350 and the vehicle 100₁ along coordinate points of the depth curve 320. The adaptation system 170 increases the separation degree between the pedestrian 350 and the vehicle 100₁ for the display depth along the coordinate points where the pedestrian 350 and the vehicle 100₁ occupy different layers. In one approach, the separation degree 360 changes to a separation degree 370 where the pedestrian 350 maintains a display depth of −5 while the vehicle 100₁ is placed at +3. Similarly, in another embodiment, the adaptation system 170 can change the display depth for the pedestrian 350 and maintain a display depth at a constant point for the vehicle 100₁ along coordinate points. Either way, the pedestrian 350 and the vehicle 100₁ can have a separation degree 370 at +8 along a display depth although the real distance remains the same along the x-axis. This makes the vehicle 100₁ appear farther away or the pedestrian 350 seem closer towards the vehicle 100 on the 3D display. Accordingly, the adaptation system 170 highlights the pedestrian 350 through exaggerating a greater separation degree with the vehicle 100₁ and other objects that are further away in the FOV.

Still referring to FIG. 3, the adaptation system 170 can display the pedestrian 350 to appear closer to the vehicle 100₁ on a 3D display (i.e., a decreased relative distance) so that a relative distance between the pedestrian 350 and the vehicle 100₂ appears more than normal. Here, the adaptation system 170 highlights the pedestrian 350 through causing the pedestrian 350 to appear closer than in actuality. Proximity can be caused by manipulating a separation degree between the pedestrian 350 and the vehicle 100₂ that is further away in the FOV. In this way, the pedestrian 350 appears closer to the vehicle 100₁ on the 3D display.

Figure 4:
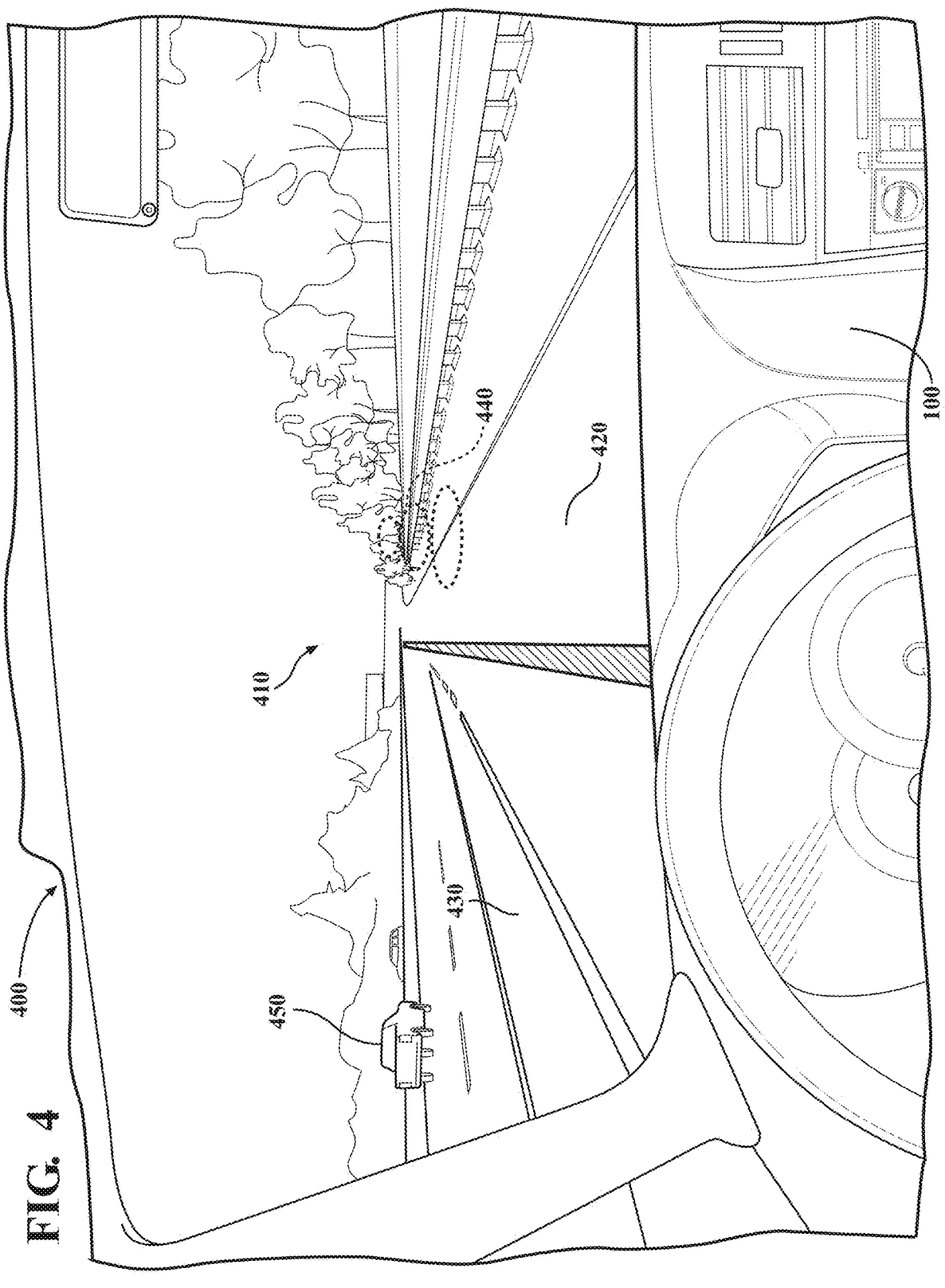
FIG. 4 illustrates an example of the adaptation system manipulating a FOV using display depth while a vehicle merges.

Turning to FIG. 4, an example of the adaptation system 170 manipulating a FOV using display depth while the vehicle 100 merges during a driving scenario 400 is illustrated. Here, the vehicle 100 can display a driving scene 410 on a windshield that includes 3D capabilities while traveling on a road 420 exhibiting a rough terrain. The vehicle 100 can be merging with a median 430 on the left automatically using an automated driving system (ADS) while traveling uphill along with the pick-up truck 450. The adaptation system 170 and the ADS may detect rocks 440 jutting out on the road 420. For example, the vehicle 100 stitches images using multiple cameras (e.g., a front camera, a bumper camera, etc.) from the one or more camera(s) 126 for detecting the rocks 440 with the ADS. A vehicle operator may be unable to clearly see the rocks 440 while traveling uphill on the road 420. As such, similar to the example in FIG. 3, the adaptation system 170 alters a display depth of a 3D display with separation degrees so that the rocks 440 are expressed more than the pick-up truck 450 in the driving scene 410. In this way, the adaptation system 170 gives the rocks 440 enhanced depth and saliency that improves safety, particularly when having a partial view during uphill travel.

Moreover, in one embodiment, the adaptation system 170 can receive a driving command from altering the driving scene 410. For example, a vehicle operator inputs a steering change as the driving command to move laterally as the vehicle 100 moves closer to the rocks 440. In another embodiment, the ADS automatically generates the driving command during automated driving that safely maneuvers the vehicle 100 around the rocks 440. Here, the ADS can rely upon the increased separation degree generated through the adaptation system 170 for estimating a collision risk with the rocks 440. Accordingly, the adaptation system 170 maps real depth about objects with display depth and alters the display depth for increasing awareness through manipulated visuals, thereby increasing travel comfort.

Figure 5:
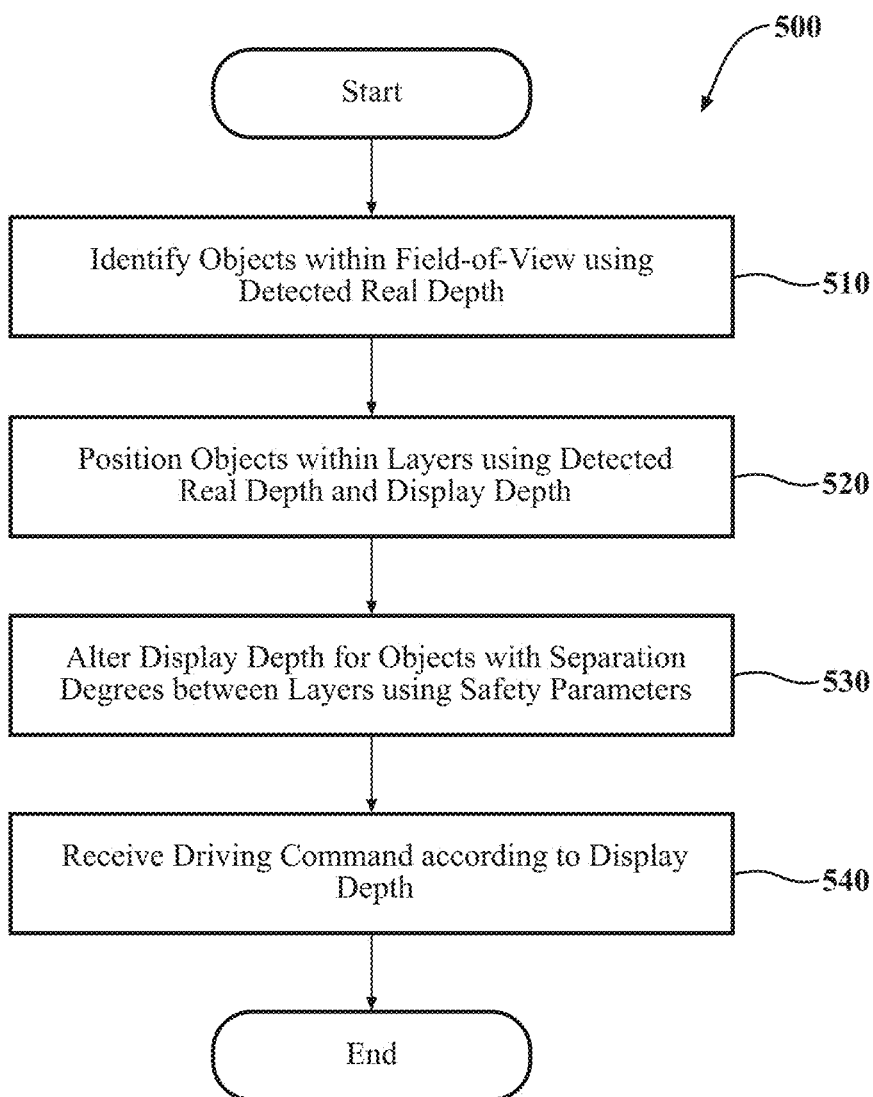
FIG. 5 illustrates one embodiment of a method that is associated with altering the display depth for the objects with the separation degree using layers for the display.

Regarding FIG. 5, a flowchart of a method 500 that is associated with altering display depth for objects with a separation degree using layers for a display is illustrated. Method 500 will be discussed from the perspective of the adaptation system 170 of FIGS. 1 and 2. While the method 500 is discussed in combination with the adaptation system 170 it should be appreciated that the method 500 is not limited to being implemented within the adaptation system 170 but is instead one example of a system that may implement the method 500.

At 510, the detection module 220 identifies objects within a FoV and detects real depth. For example, the detection module 220 acquires the sensor data 250 having information about the objects. The sensor data 250 includes at least camera images, data from radar sensors 123, data from LIDAR sensors 124, etc. In one approach, the camera is a monocular camera, a stereo camera, etc., from the vehicle 100 that feeds video for depth estimation. A ML model can then detect depth with a FoV of a camera. As such, a 3D display can use depth outputted by the ML model to display the objects within a scene.

At 520, the adaptation system 170 positions the objects within layers using the real depth that was detected and a display depth. The real depth may be one of a physical depth, real distance, etc., of the objects located away from a camera source. In one approach, the camera is installed on the vehicle 100. As previously explained, the real depth can be mapped with display depth for visualization. A 3D display creates a parallax effect for left and right eyes where a viewer sees different images of a scene using optics within the display and software-driven imagery. The viewer perceives depth through a disparity between the different images for various objects according to the display depth. In another approach, the display depth encompasses coordinate points of the 3D display that are one of continuous, layered, etc., associated with an image frame. A layer can have one or more objects exhibited at the display depth for perceiving different depths between layers located at different coordinate points. Besides layers, in one embodiment, the 3D display can continuously map real distance to the objects along the coordinate points that are fine.

At 530, the adaptation system 170 alters the display depth for the objects with separation degrees between the layers using the safety parameters 240. A separation degree can be a difference between display depth of objects within a FOV relative to the real depth. Here, the safety parameters 240 can be a separation distance between the vehicle 100 and another vehicle, a ToC with an object, a risk level, and state information (e.g., gaze) about an operator factored for altering the display depth. Furthermore, the adaptation system 170 can also gauge operator awareness before exaggerating and altering the display depth using the sensor data 250. An object can be another vehicle and a pedestrian within a camera FOV located ahead of the vehicle 100. In various implementations, the adaptation system 170 generates a view having the pedestrian in a first layer (e.g., a foreground) and another vehicle 100 in a second layer (e.g., a background) further away from the vehicle 100.

Moreover, originally the separation degree between the pedestrian and the another vehicle may be displayed as +5 along depth curve coordinates associated with the display depth. Changing the separation degree between the layers can cause the pedestrian to appear closer than the another vehicle. For instance, increasing the separation degree to +10 involves maintaining the pedestrian at a display depth of a while moving the another vehicle to b. As previously explained, the adaptation system 170 can also change the display depth for the pedestrian while maintaining a display depth at a constant point for the another vehicle. As such, the pedestrian and the another vehicle can have the separation degree at +10 along the display depth while the real depth remains the same along the x-axis of the depth curve. In this way, the another vehicle appears farther away than the pedestrian towards the vehicle 100 on the 3D display, thereby increasing attention to the pedestrian and avoiding a potential collision.

At 540, the adaptation system 170 receives a driving command according to the display depth. For instance, a vehicle operator focuses more attention on a pedestrian rather than the another vehicle ahead due to the display depth after alterations. As the pedestrian moves closer to the vehicle 100, the operator inputs braking as the driving command to decelerate. Furthermore, in one embodiment, the ADS automatically generates the driving command during automated driving to safely maneuver around the pedestrian using the increased separation degree generated through the adaptation system 170. Accordingly, the adaptation system 170 can map real depth associated with objects within layers with display depth for alterations that subtly and intuitively increase awareness through manipulated visuals, thereby increasing safety and comfort.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the adaptation system 170, and/or the automated driving module(s) 160 can be operatively connected to communicate with the various vehicle systems

140 and/or individual components thereof. For example, the processor(s) 110 and/or the automated driving module(s) 160 can be in communication to send and/or receive information from the various vehicle systems 140 to control the movement of the vehicle 100. The processor(s) 110, the adaptation system 170, and/or the automated driving module(s) 160 may control some or all of the vehicle systems 140 and, thus, may be partially or fully autonomous as defined by the society of automotive engineers (SAE) levels 0 to 5.

The processor(s) 110, the adaptation system 170, and/or the automated driving module(s) 160 can be operatively connected to communicate with the various vehicle systems 140 and/or individual components thereof. For example, the processor(s) 110, the adaptation system 170, and/or the automated driving module(s) 160 can be in communication to send and/or receive information from the various vehicle systems 140 to control the movement of the vehicle 100. The processor(s) 110, the adaptation system 170, and/or the automated driving module(s) 160 may control some or all of the vehicle systems 140.

The processor(s) 110, the adaptation system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the adaptation system 170, and/or the automated driving module(s) 160 can control the direction and/or speed of the vehicle 100. The processor(s) 110, the adaptation system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the adaptation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An adaptation system comprising:
a memory storing instructions that, when executed by a processor, cause the processor to:
identify objects within a field-of-view (FOV) using real depth that is detected by a vehicle;
position the objects within layers using the real depth and a display depth;
alter the display depth for the objects with a separation degree between the layers using a safety parameter, the display depth is associated with coordinate points of a display having the display depth associated with a y-axis and the real depth associated with an x-axis, and the separation degree is distorted, and the display depth is associated with a quadrangular space; and
receive a driving command according to the display depth.

2. The adaptation system of claim 1, wherein the instructions to alter the display depth further include instructions to:
increase the separation degree between another vehicle and a pedestrian of the objects along the coordinate points, wherein the another vehicle and the pedestrian are ahead of the vehicle; and
the another vehicle and the pedestrian occupy different layers among the layers;
wherein the quadrangular space is associated with a comfort zone and the objects are in a background of a scene on the display.

3. The adaptation system of claim 2 further including instructions to:
position the another vehicle at an increased distance from the vehicle on the coordinate points and maintain the pedestrian at a constant point on the coordinate points.

4. The adaptation system of claim 1, wherein the instructions to alter the display depth further include instructions to:
increase the separation degree between two of the objects for the display depth having different classifications and located ahead of the vehicle along the coordinate points; and
the two of the objects occupying different layers among the layers.

5. The adaptation system of claim 1, wherein the layers are continuous for mapping the objects within an image frame on the display and the vehicle incorporates the display within one of a heads-up display (HUD) and an infotainment system.

6. The adaptation system of claim 1, wherein the display is a three-dimensional (3D) display having optical components, and the optical components give the objects a 3D depth according to the display depth and the separation degree.

7. The adaptation system of claim 1, wherein the safety parameter is a time-to-collision to the objects computed by a machine learning (ML) model and the real depth is a physical depth of the objects located away from the vehicle.

8. A non-transitory computer-readable medium comprising: instructions that when executed by a processor cause the processor to:
identify objects within a field-of-view (FOV) using real depth that is detected by a vehicle;
position the objects within layers using the real depth and a display depth;
alter the display depth for the objects with a separation degree between the layers using a safety parameter, the display depth is associated with coordinate points of a display having the display depth associated with a y-axis and the real depth associated with an x-axis, and the separation degree is distorted, and the display depth is associated with a quadrangular space; and
receive a driving command according to the display depth.

9. The non-transitory computer-readable medium of claim 8, wherein the instructions to alter the display depth further include instructions to:
increase the separation degree between another vehicle and a pedestrian of the objects along the coordinate points, wherein the another vehicle and the pedestrian are ahead of the vehicle; and
the another vehicle and the pedestrian occupy different layers among the layers;
wherein the quadrangular space is associated with a comfort zone and the objects are in a background of a scene on the display.

10. The non-transitory computer-readable medium of claim 9 further including instructions to:
position the another vehicle at an increased distance from the vehicle on the coordinate points and maintain the pedestrian at a constant point on the coordinate points.

11. The non-transitory computer-readable medium of claim 8, wherein the instructions to alter the display depth further include instructions to:

increase the separation degree between two of the objects for the display depth having different classifications and located ahead of the vehicle along the coordinate points; and the two of the objects occupying different layers among the layers.

12. The non-transitory computer-readable medium of claim 8, wherein the layers are continuous for mapping the objects within an image frame on the display and the vehicle incorporates the display within one of a heads-up display (HUD) and an infotainment system.

13. The non-transitory computer-readable medium of claim 8, wherein the display is a three-dimensional (3D) display having optical components, and the optical components give the objects a 3D depth according to the display depth and the separation degree.

14. A method comprising:

identifying objects within a field-of-view (FOV) using real depth that is detected by a vehicle;

positioning the objects within layers using the real depth and a display depth;

altering the display depth for the objects with a separation degree between the layers using a safety parameter, the display depth is associated with coordinate points of a display having the display depth associated with a y-axis and the real depth associated with an x-axis, and the separation degree is distorted, and the display depth is associated with a quadrangular space; and receiving a driving command according to the display depth.

15. The method of claim 14, wherein altering the display depth further includes:

increasing the separation degree between another vehicle and a pedestrian of the objects along the coordinate points, wherein the another vehicle and the pedestrian are ahead of the vehicle; and the another vehicle and the pedestrian occupy different layers among the layers;

wherein the quadrangular space is associated with a comfort zone and the objects are in a background of a scene on the display.

16. The method of claim 15 further comprising:

positioning the another vehicle at an increased distance from the vehicle on the coordinate points and maintaining the pedestrian at a constant point on the coordinate points.

17. The method of claim 14, wherein altering the display depth further includes:

increasing the separation degree between two of the objects for the display depth having different classifications and located ahead of the vehicle along the coordinate points; and the two of the objects occupying different layers among the layers.

18. The method of claim 14, wherein the layers are continuous for mapping the objects within an image frame on the display and the vehicle incorporates the display within one of a heads-up display (HUD) and an infotainment system.

19. The method of claim 14, wherein the display is a three-dimensional (3D) display having optical components, and the optical components give the objects a 3D depth according to the display depth and the separation degree.

20. The method of claim 14, wherein the safety parameter is a time-to-collision to the objects computed by a machine learning (ML) model and the real depth is a physical depth of the objects located away from the vehicle.

* * * * *